(12) United States Patent
Heitfield

(10) Patent No.: US 7,540,053 B2
(45) Date of Patent: Jun. 2, 2009

(54) SWEEPING APPARATUS

(76) Inventor: John E. Heitfield, 1155 Donald Dr., Greenville, OH (US) 45331

( * ) Notice: Subject to any disclaimer, the term of this patent is extended or adjusted under 35 U.S.C. 154(b) by 101 days.

(21) Appl. No.: 11/517,788

(22) Filed: Sep. 7, 2006

(65) Prior Publication Data

US 2008/0060151 A1    Mar. 13, 2008

(51) Int. Cl.
*E01H 1/05* (2006.01)
(52) U.S. Cl. ............................ 15/82; 15/52.1
(58) Field of Classification Search ............... 15/52.1, 15/79.1, 82, 83
See application file for complete search history.

(56) References Cited

U.S. PATENT DOCUMENTS

| | | | | | |
|---|---|---|---|---|---|
| 423,718 | A | * | 3/1890 | Barrows ......................... | 15/82 |
| 483,702 | A | * | 10/1892 | Vandemark .................... | 15/84 |
| 498,402 | A | * | 5/1893 | McArthur ...................... | 15/83 |
| 536,637 | A | * | 4/1895 | Lucas ............................ | 15/55 |
| 557,416 | A | * | 3/1896 | McGuire et al. ............... | 15/82 |
| 644,739 | A | * | 3/1900 | Greeley et al. ................ | 15/82 |
| 926,723 | A | * | 7/1909 | Briggs ........................... | 15/83 |
| 982,570 | A | * | 1/1911 | Brooks .......................... | 15/83 |
| 1,892,961 | A | * | 1/1933 | Parker ........................... | 15/83 |
| 2,054,713 | A | * | 9/1936 | Randolph ...................... | 15/79.1 |
| 2,158,967 | A | * | 5/1939 | Hilliard ......................... | 15/82 |
| 2,259,632 | A | * | 10/1941 | Grace ............................ | 15/82 |
| 2,268,059 | A | * | 12/1941 | Parker et al. .................. | 15/83 |
| 2,313,412 | A | * | 3/1943 | Wells ............................ | 15/82 |
| 3,591,883 | A | * | 7/1971 | Armstrong et al. ............ | 15/149 |
| 3,823,435 | A | * | 7/1974 | Rhodes et al. ................ | 15/79.1 |
| 3,947,912 | A | * | 4/1976 | Michaels ...................... | 15/79.1 |
| 3,995,415 | A | * | 12/1976 | Hoffmann ..................... | 56/364 |
| 4,001,908 | A | * | 1/1977 | Franklin ........................ | 15/83 |
| 4,366,593 | A | * | 1/1983 | Parikh .......................... | 15/52.1 |
| 2004/0060139 | A1 | * | 4/2004 | Peters ........................... | 15/83 |

* cited by examiner

*Primary Examiner*—Mark Spisich
(74) *Attorney, Agent, or Firm*—Lech Law, LLC; Robert R. Lech

(57) ABSTRACT

A sweeper apparatus is disclosed, which concerns at least one wheel, at least one brush and a means for attaching a pulling agent. The wheels are pulled in one direction causing the one or more brushes to spin at a desired speed flicking sand particles into small or large holes on the ground. The brushes are in mechanical cooperation with the wheels allowing the wheels and brushes to spin in substantially opposite directions. The wheels are driven through the use of a pulling agent like golf cart, truckster, tractor or other movement device which can cause the sweeping apparatus to be moved over a desired area.

2 Claims, 6 Drawing Sheets

SWEEPING APPARATUS

BACKGROUND OF THE INVENTION

1. Field of the Invention

The present invention relates generally to methods and apparatus for grass, turf and artificial turf building and maintenance. More specifically, the present invention relates to a method for sweeping and a wheeled sweeper which can be pulled over the grass or turf.

The sweeper has one or more brushes, with hard bristles, which spin relatively slow allowing for optimal brushing of grass or turf. This sweeper can eliminate undesired wear and tear on grass and turf, save approximately forty minutes per 7,000 square feet of green and can completely fill aerated holes in three passes or less.

2. Description of the Related Art

Apparatus for sweeping turf are well known. Such apparatus are useful for building and maintaining turf, and find particular utility for golf course maintenance. One example prior art apparatus is the "Sweeping Apparatus" of Agergard, et al. described in U.S. Pat. No. 4,674,143 as comprising a manually handled carriage with at least one pair of rear wheels and at least one front wheel and a power operated cylindrical sweeping brush.

Another example prior art apparatus is the "Green Sweeper" of Q. A. Shaw described in U.S. Pat. No. 1,674,306. Shaw's sweeper provides a series or gang of ground-treating elements, preferably brushes, which are secured to common means for drawing them over the ground.

While the prior art apparatus are adequate for sweeping in certain contexts, they are not fully effective for filling of aeration greens, surface clean-up with minimal passes. Further, several prior art apparatus require excessive time to treat turf and result in excessive turf wear.

SUMMARY OF THE INVENTION

It is an object of the present invention for the brush to rotate slowly relative to the amount of ground traveled. The slow rotation of the brush allows the bristles on the brush to flick the sand or other material only a couple of inches in front of the brush. This creates a small build up of sand in front of the brush. When this build up of sand is pushed over an aerated hole the sand slowly falls into the hole filling it completely.

Another object of the present invention is to removes grain from the grass or turf. The movement of the brush against the grass or turf can remove grain from the ground as a by product of the brushes flicking operation.

Another object of the present invention is to brush sand into aerated holes in such a manner to reduce the amount of settling of the sand. The machine fills aerated holes with an appropriate amount of sand so that they are full to the brim leaving no room for settling with the result of a flatter surface.

The present invention provides numerous advantages and benefits over prior art sweeping apparatus. Specifically, the disclosed method and apparatus facilitate better removal of grain from turf. The disclosed method and apparatus provide significant time and labor savings compared to certain prior art apparatus. The disclosed method and apparatus further reduces settling of sand upon filling aeration hole.

It is another advantage of the disclosed method and apparatus that they facilitate a complete filling of aeration greens and sufficient clean-up in a minimal number of passes.

Yet another advantage of the present invention is that it only requires one person to operate the machine due to the weight distribution over the wheels and the easy to use attachments.

Still another advantage of the present invention is that it can stand up or lay down grass or turf so that the grass or turf is at a desired angle. This is a result of the brushes rotation. The brush spins causing the blades of grass or turf to conform to the direction of the brush.

A further advantage of the present invention is that it reduces wear and tear on grass or turf. The slower moving brush does not cut, move, scrape, or otherwise damage the grass or turf as much as a faster moving brush.

Still a further advantage of the present invention is that it enables the creation of wind rows in sand when pulled along the ground in an arc.

According to a first aspect of the present invention, a first example sweeper apparatus is provided. The sweeper apparatus comprises a frame which includes a means for attaching a pulling agent. The sweeper further comprises at least one drive wheel and at least one rotary brush member, each attached to the frame. The drive wheel and the rotary brush are mechanically connected by a traction drive mechanism. The traction drive mechanism is configured to transfer power from the drive wheel to the rotary brush member. The traction drive mechanism is further configured to rotate the first brush member three complete rotations over a travel distance equal to at least the circumference of the first brush member.

According to a second aspect of the present invention, a second sweeper apparatus is provided. The second sweeper apparatus comprises two drive wheels and two rotary brush members, each attached to the frame. The drive wheels and the rotary brushes are mechanically connected by two traction drive mechanisms. The traction drive mechanisms are configured to transfer power from each respective drive wheel to the respective rotary brush member. The traction drive mechanisms are further configured to rotate each brush member no less than one complete rotation over a travel distance equal to six times the circumference of the brush member and no more than three complete rotations over a travel distance at least equal to the circumference of the brush member.

The second sweeper apparatus includes four brush height adjustment mechanisms, two for each rotary brush member. The second sweeper apparatus further includes a transport lift mechanism attached to the frame and at least one transport wheel attached to the transport lift mechanism. The transport lift mechanism is movable between a first position in which the frame is supported by the drive wheels and a second position in which the frame is supported by the transport wheel(s).

The objects, features and advantages of the present invention are readily apparent from the following description of the preferred embodiments when taken in connection with the accompanying drawings.

BRIEF DESCRIPTION OF THE DRAWINGS

Comprehension of the invention is facilitated by reading the following detailed description, in conjunction with the associated drawings, in which.

DRAWING REFERENCE NUMERALS

Figure 1:
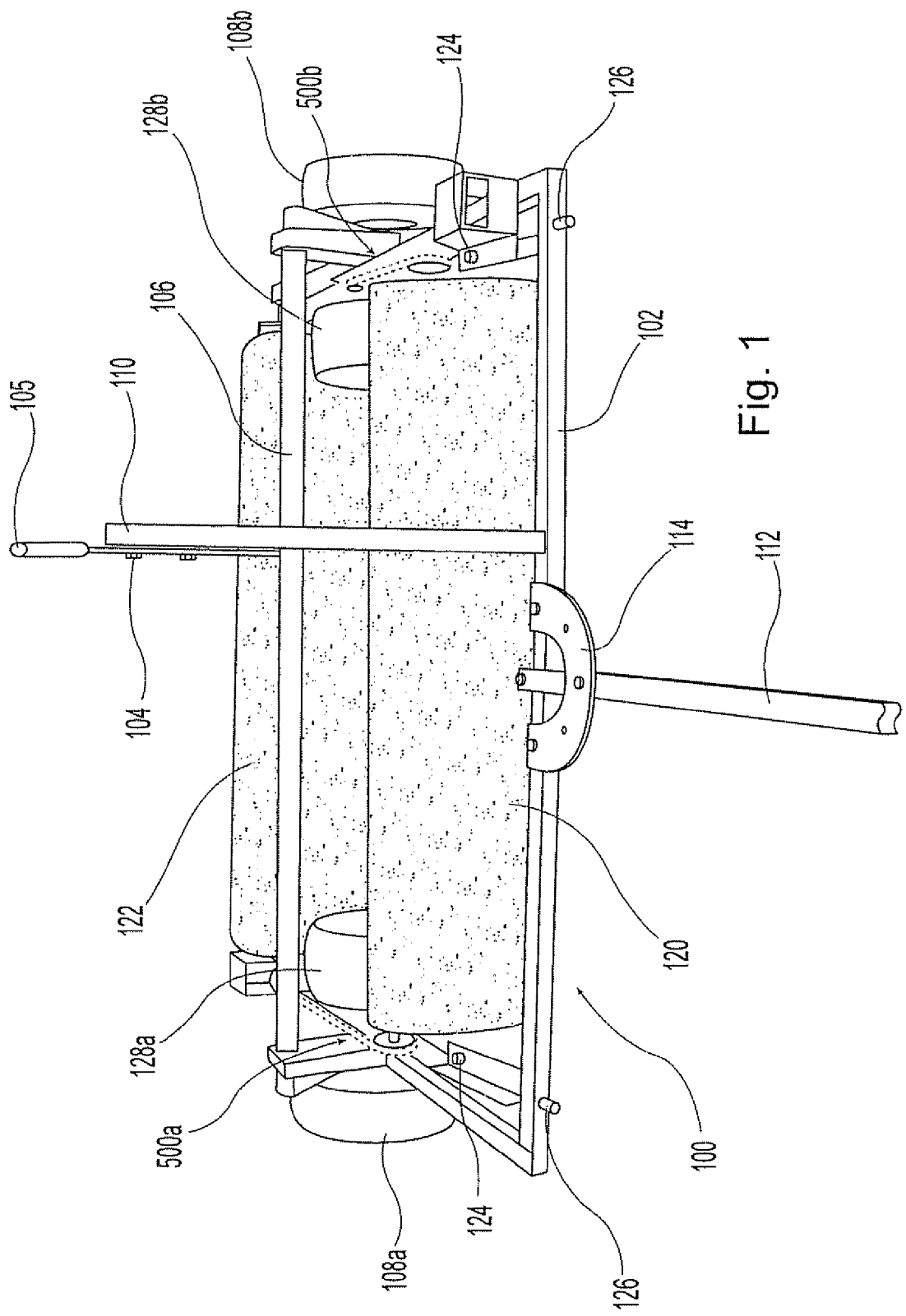
FIG. 1 is a front view of an example sweeper apparatus in accordance with the present invention.

The following reference characters identify the associated elements depicted in the drawings describing the present invention:

| | |
|---|---|
| 100 | Sweeper |
| 102 | Frame |
| 104 | Transport lift arm |
| 105 | Transport lift handle |
| 106 | Transport lift mechanism |
| 108a | Transport wheel |
| 108b | Transport wheel |
| 110 | Engagement mechanism |
| 112 | Towing tongue |
| 113 | Tongue hinge bolt |
| 114 | Tongue adjustment mechanism |
| 115 | Tongue adjustment bolt |
| 116 | Hitch |
| 118 | Hitch bolt |
| 120 | Forward brush |
| 122 | Rear brush |
| 124 | Height adjustment mechanism |
| 126 | Chain adjustment mechanism |
| 128a | Drive wheel |
| 128b | Drive wheel |
| 500a | Drive mechanism |
| 500b | Drive mechanism |
| 510a | Drive sprocket |
| 510b | Drive sprocket |
| 520a | Brush sprocket (rear) |
| 520b | Brush sprocket (front) |
| 530a | Chain for rear brush |
| 530b | Chain for front brush |
| 540a | Idler sprocket |
| 540b | Idler sprocket |

DETAILED DESCRIPTION OF THE DRAWINGS

Generally, the present invention is directed to a machine with at least one wheel and at least one rotary brush. The wheeled machine is towed by a small truckster, golf cart or tractor along the ground which causes a drive mechanism to rotate the rotary brush(es) which are likewise pulled along the ground. Each brush is attached to at least one drive wheel. The drive wheel may be connected with the rotary brushes by sprockets and chains. The chains are routed around the sprockets so that the rotary brushes turn in opposite directions as the drive wheels. This device is pulled over a desired area usually containing grass, turf or sand and through the spinning of the brush performs a variety of desired tasks on the grass, turf or sand.

Referring now to the drawing figures, FIGS. 1-6 depict an example sweeping apparatus 100 embodying the present invention. Sweeping apparatus 100 is intended to be towed behind a pulling agent such as, for example, a tractor, golf cart or small truckster, not shown. Sweeping apparatus 100 includes a frame 102, and may be removably attached to the towing agent using a hitch 116 and hitch bolt 118, shown more fully in FIG. 3. Hitch 116 is disposed at a first end of a towing tongue 112.

Figure 4:
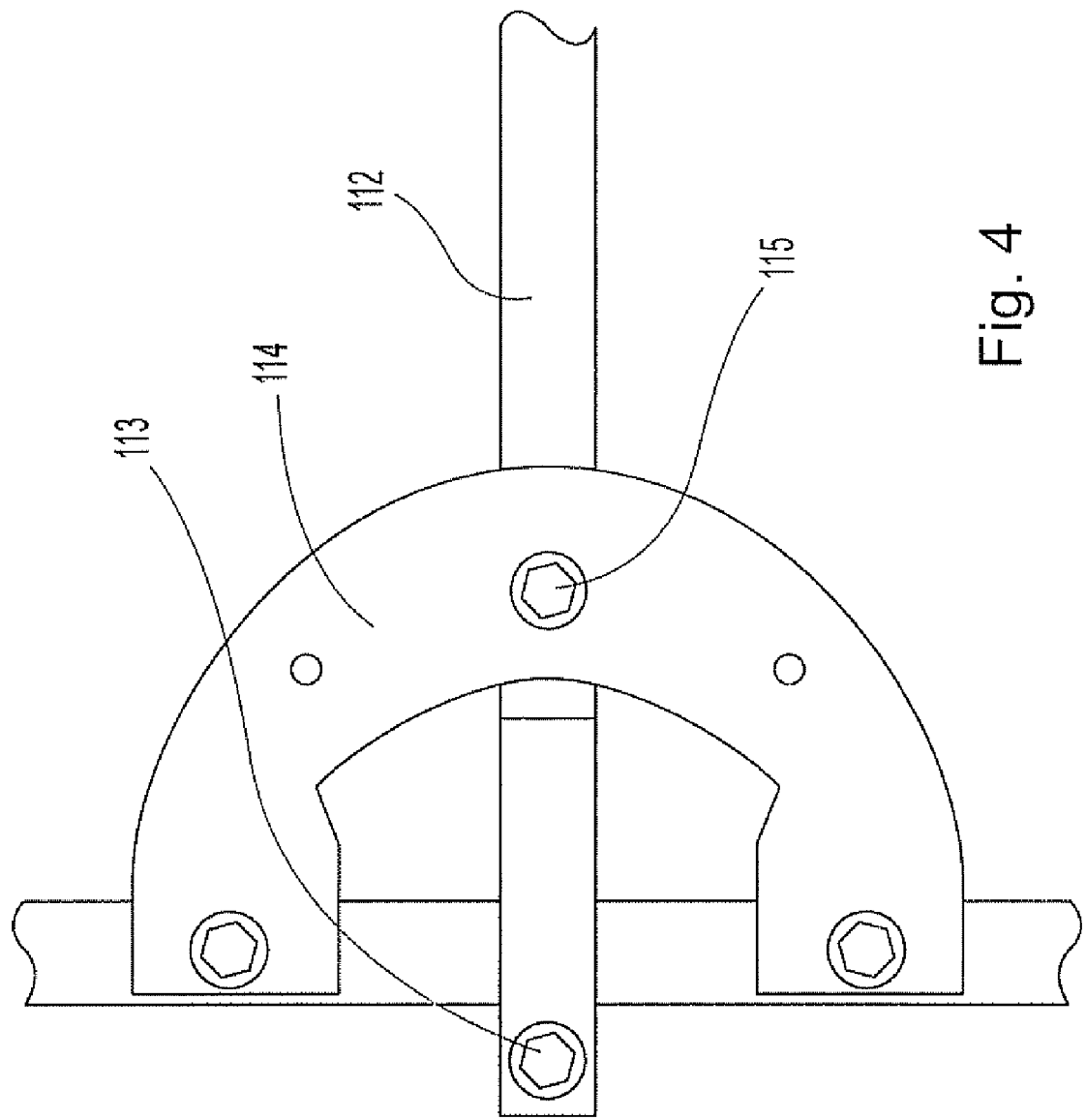
FIG. 4 is a top view of the tongue adjustment mechanism of the sweeper apparatus of FIG. 1.

Referring now to FIG. 4, towing tongue 112 is shown to attach to the frame 102 at a second end using a tongue hinge bolt 113, tongue adjustment mechanism 114 and tongue adjustment bolt 115. Tongue adjustment mechanism 114 enables towing tongue 112 to be positioned at several angles, such as 45 degrees left, 90 degrees and 45 degrees right, relative to the towing agent using tongue adjustment bolt 115.

Figure 2:
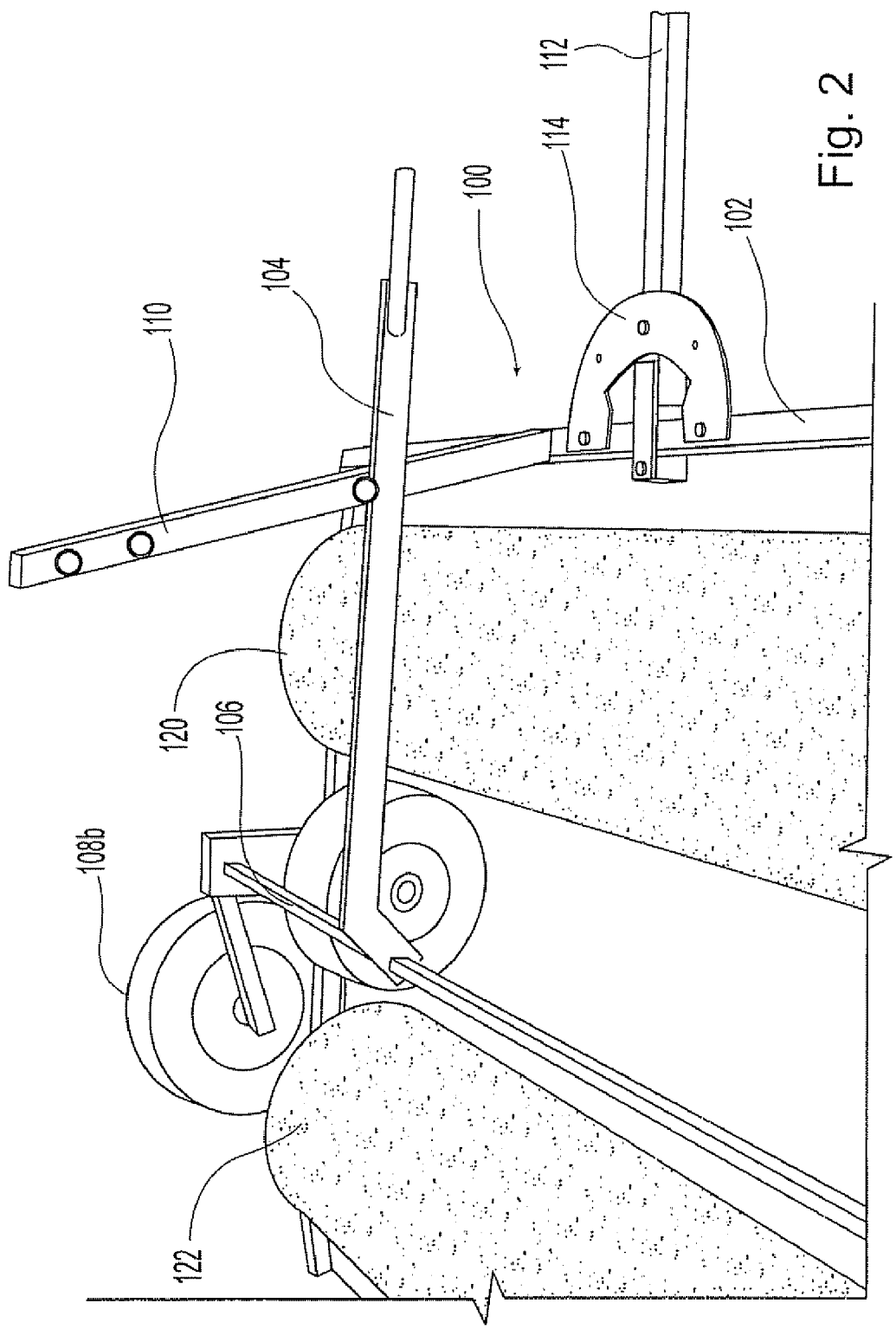
FIG. 2 is a perspective view of the sweeper apparatus of FIG. 1.
Figure 3:
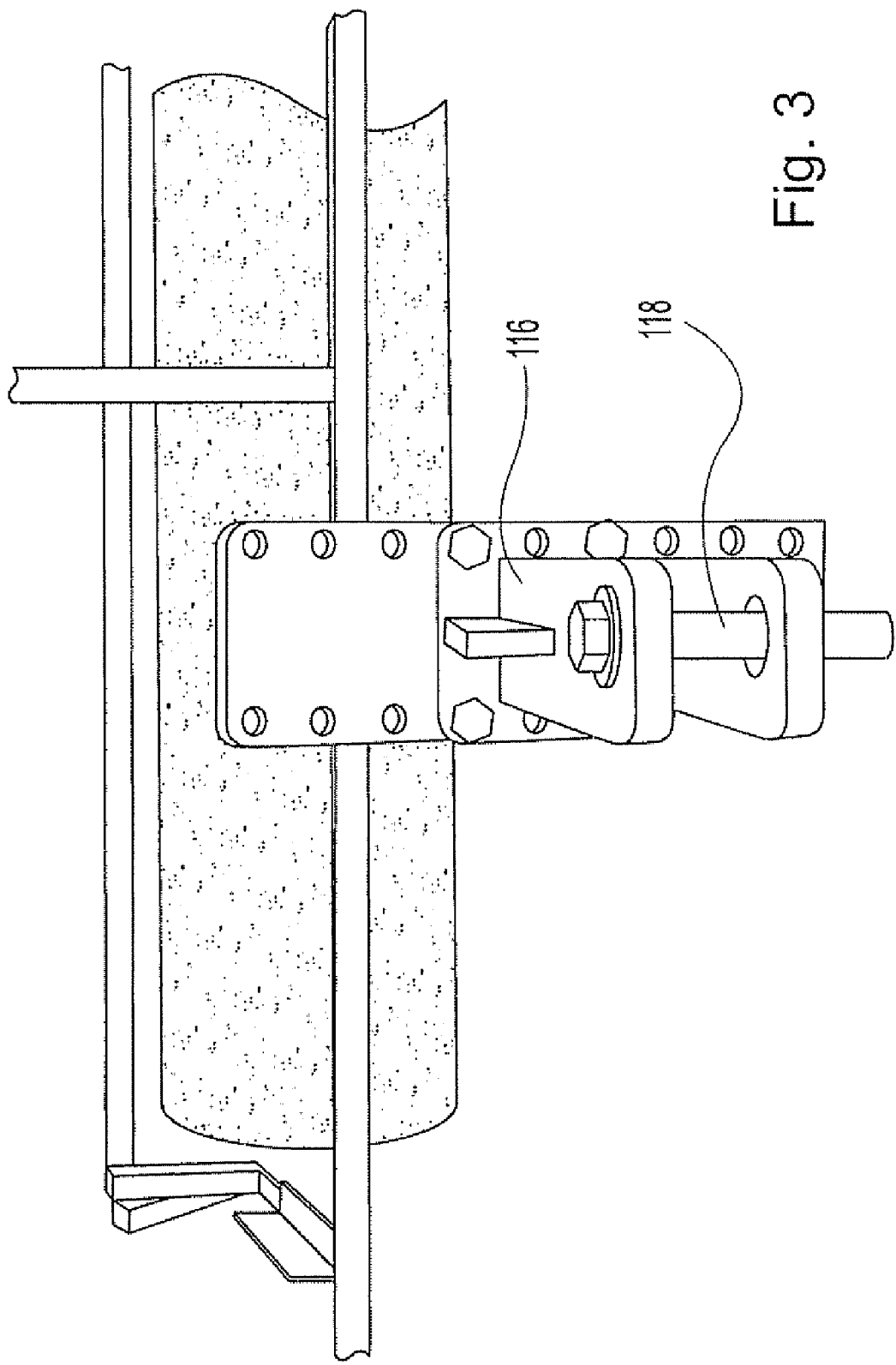
FIG. 3 is a front view of the hitch of the sweeper apparatus of FIG. 1.

With continuing reference to FIGS. 1 and 2, sweeping apparatus 100 further includes a transport lift mechanism 106 attached to frame 102. The transport lift mechanism 106 controls the position of two attached free spinning transport wheels 108a and 108b. The transport lift mechanism 106 may be positioned by a user using transport lift handle 105 to move transport lift arm 104 between a first position, also called the transport position, and second position, also called the drive or engaged position, along engagement mechanism 110. FIG. 1 depicts the sweeping apparatus 100 having the transport lift arm 104 at the first position, and FIG. 2 depicts the sweeping apparatus 100 having the transport lift arm 104 at the second position.

In the transport position, transport wheels 108a and 108b are disposed so as to make contact with the ground thereby supporting sweeping apparatus 100. In the drive position, transport lift mechanism 106 lifts transport wheels 108a and 108b up and away from the ground so as to allow drive wheels 128a and 128b, each having a circumference of 44 inches, to make contact with the ground and support sweeping apparatus 100.

When sweeper 100 is operating with the transport lift arm 104 in the drive position, towing of the sweeper causes the drive wheels 128a and 128b to rotate. Drive wheels 128a and 128b cooperate with drive mechanisms 500a and 500b to turn brushes 122 and 120, respectively. Example brushes 122 and 120 have a circumference of 48 inches and employ bristles that are 0.030 diameter virgin polypropylene with a crimp amplitude of 2.25 inches. Each brush is wrapped on a solid 3 inch diameter tube with pitch of 0.5 inches between the continuous wraps. The material is 12 inches long and folded in half in the bristle retention channel resulting in a bristle trim of 6 inches.

Determining the preferred brush for special applications includes consideration of number of issues. Basically, one determines the correct bristle stiffness to move the material being swept without damaging the swept surface. The factors involved in bristle stiffness of the example brushes include: bristle diameter (0.030), bristle length (6 in) and bristle fill the pitch (0.5 in) between wraps of continuous channel.

Sweeper 100 includes two height adjustment mechanism 124 for each brush 122 and 120. Each example height adjustment mechanism includes a threaded adjustment bolt attached to an angled portion of frame 102. The angled portion of frame 102 is angled at 10-15 degrees with respect to the normal axial plane of the frame 102.

Sweeper 100 further includes a chain adjustment mechanism 126 for each drive mechanism 500a and 500b. Chain adjustment mechanism 126 includes a threaded adjustment bolt which enables each brush to be positioned so as to allow an associated brush sprocket to take up slack in an associated chain, as described more particularly below.

Figure 5:
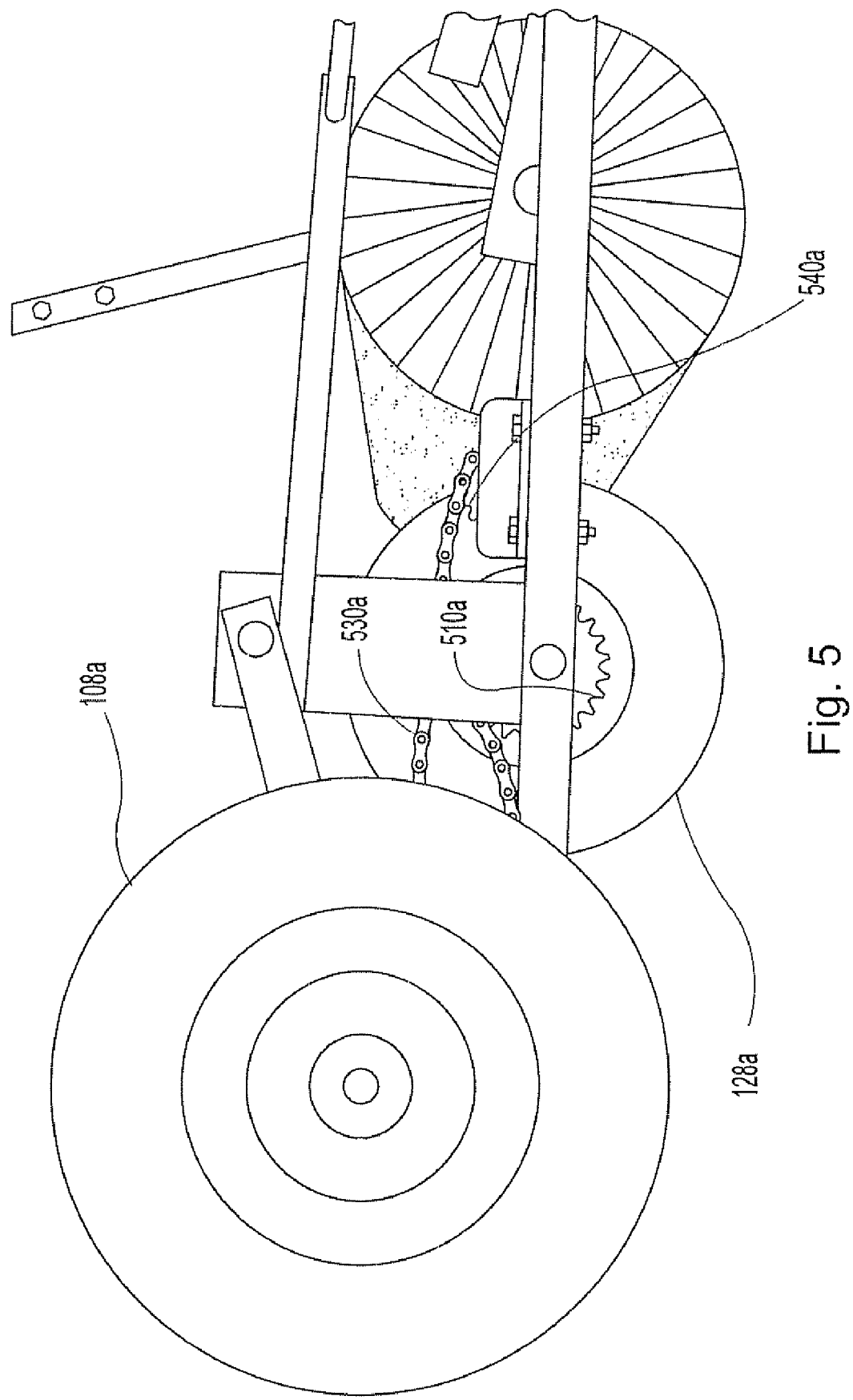
FIG. 5 is a side view of the drive mechanism of the sweeper apparatus of FIG. 1.
Figure 6:
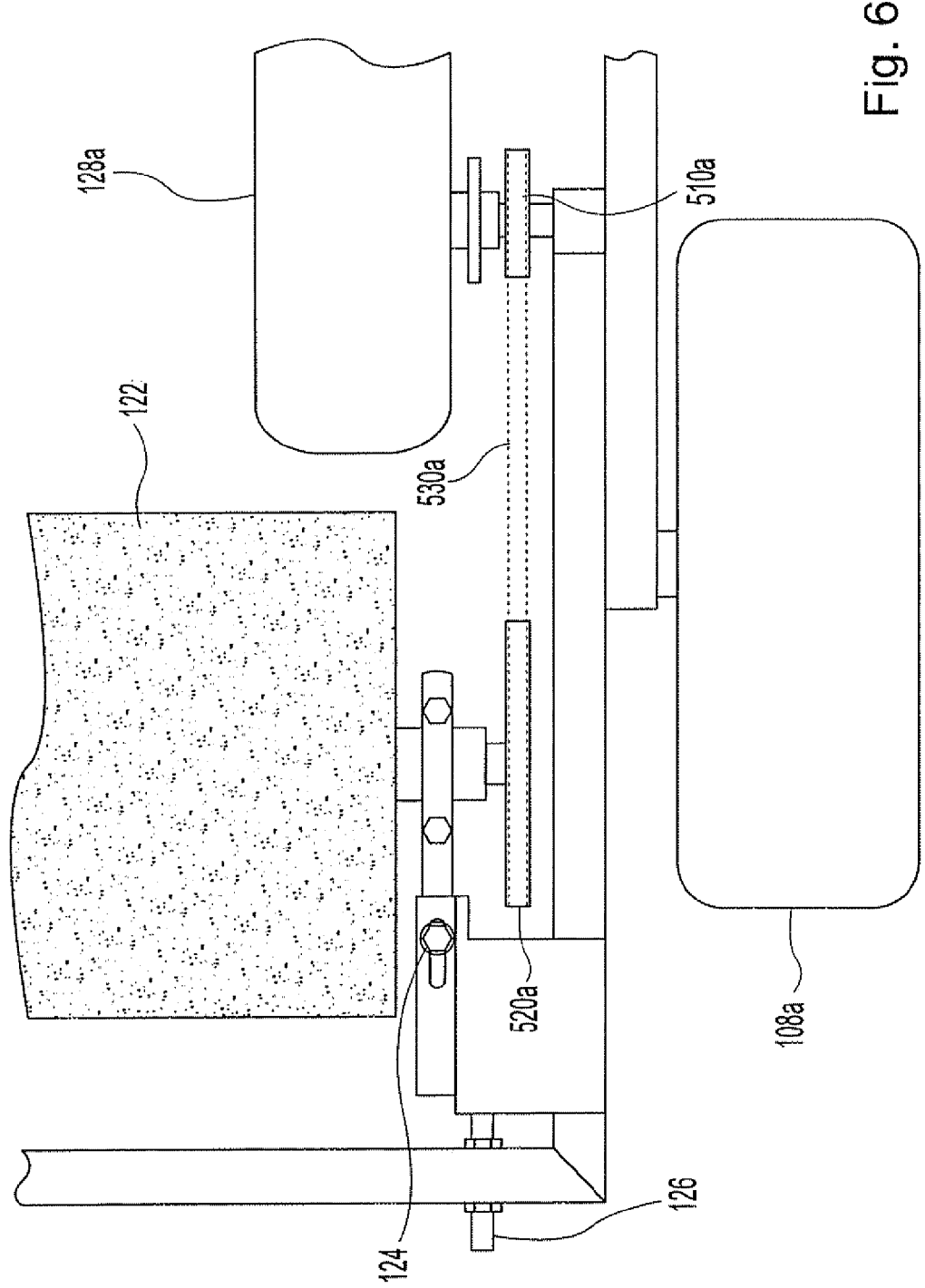
FIG. 6 is a top view of the drive mechanism of the sweeper apparatus of FIG. 1.

Referring now to FIGS. 5 and 6, detailed views of drive mechanism 500a of sweeper 100 are provided. As shown, drive sprocket 510a is connected to drive wheel 128a and brush sprocket 520a is connected to brush 122. Rotation of drive wheel 128a and drive sprocket 510a causes counter rotation of brush sprocket 520a and brush 122 through their mutual cooperation with chain 530a. As shown, in order to achieve counter-rotation of brush 122, drive sprocket 510a engages chain 530a along the underside of a chain loop created between brush sprocket 520a and an idler sprocket 540a.

This sprocket configuration results in a counter-rotation of brush 122 with respect to the rotation of drive wheel 128a. Of course, this is merely one embodiment of a drive mechanism which could be employed in accordance with the present invention. Alternate embodiments may use belts, gears or any other structure known by one of ordinary skill in the art to produce such a counter-rotation.

The ratio of rotation of the brushes to the amount of ground traveled is important to the effectiveness of this device. In the example embodiment, the brush sprocket 520a has 40 teeth and the drive sprocket 510a has 16 teeth, providing a 2.5:1 rotational ratio between the brush and the drive wheel. This means that the brushes 122 and 120 turn one complete rotation for every 2.5 complete rotations of the drive wheels 128a and 128b. When compared to the amount of ground traveled, the brushes 122 and 120 turn one complete revolution, or 48 inches, for every 110 inches traveled. Thus, the example sweeper 100 has a 1:2.291667 ratio of brush circumference employed to amount of ground traveled.

If the brush rotates too little or too much, the efficiency of the sweeper apparatus of the present invention will be lost. One known range of ratios of brush circumference employed to amount of ground traveled is 3:1 to 1:6.

For tasks such as filling aeration holes, the relatively slow speed of the brush's revolution causes sand to be flicked a few inches in front of the brush. Sand slowly builds up in front and then falls into any small hole, divot, aerated hole or other irregularity in front of the brush. This will completely fill aeration holes and can be beneficial to many other functions on grass or turf.

Of course, the present invention has been described with respect to the embodiments illustrated herein, but other embodiments are envisioned to be within the scope of the present invention. For example, embodiments are envisioned which employ various combinations of sprocket ratios and circumference ratios for the drive wheels and brushes. In fact, it is envisioned that the present invention encompasses a sweeper which includes multiple brushes, and each brush could have the same or different ratio and/or rotational speed as another brush of the apparatus. Further, the height of each brush could be independently determined or the height of multiple brushes could be controlled by a common height adjustment mechanism. Still further, one drive wheel could power multiple brushes.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A sweeping apparatus, comprising:
   a frame, the frame including a means for attaching a pulling agent;
   a first drive wheel supporting the frame; and
   a first rotary brush member structure supported by the frame;
   a first brush height adjustment mechanism for adjusting a distance between the first rotary brush member with respect to ground over which the sweeping apparatus travels;
   a first traction drive mechanism mechanically connecting the first drive wheel to the first rotary brush member, the first traction drive mechanism configured to transfer power from the first drive wheel to the first rotary brush member, the first traction drive mechanism further configured to rotate the first brush member no less than one complete rotation over a travel distance equal to six times the circumference of the first brush member and no more than three complete rotations over a travel distance equal to the circumference of the first brush member;
   a second drive wheel supporting the frame;
   a second rotary brush member supported by the frame;
   a second brush height adjustment mechanism for adjusting a distance between the second rotary brush member with respect to the ground over which the sweeping apparatus travels;
   a second traction drive mechanism mechanically connecting the second drive wheel to the second rotary brush member, the second traction drive mechanism configured to transfer power from the second drive wheel to the second rotary brush member, the second traction drive mechanism further configured to rotate the second brush member no less than one complete rotation over a travel distance equal to six times the circumference of the second brush member and no more than three complete rotations over a travel distance equal to the circumference of the second brush member;
   a transport lift mechanism attached to the frame; and
   at least one transport wheel attached to the transport lift mechanism;
   wherein the transport lift mechanism is movable between a first position in which the frame is supported by at least the first and second drive wheels and a second position in which the frame is supported by the at least one transport wheel.

2. The sweeping apparatus of claim 1, wherein the first brush member and the second brush member are configured to rotate at different rotational speeds.

* * * * *